May 25, 1926.

W. P. CHANDLER

BRACE

Filed Sept. 1, 1925

1,586,142

William P. Chandler
Inventor

By C. A. Snow & Co.
Attorneys

Patented May 25, 1926.

1,586,142

UNITED STATES PATENT OFFICE.

WILLIAM P. CHANDLER, OF GREENVILLE, SOUTH CAROLINA, ASSIGNOR OF ONE-HALF TO SOLOMON J. EASSY, OF GREENVILLE, SOUTH CAROLINA.

BRACE.

Application filed September 1, 1925. Serial No. 53,882.

The present invention relates to a radius rod construction and aims to provide a radius rod of a novel construction adapted to be readily and easily applied to a well known type of motor vehicle for bracing the front axle and insuring against damage to the vehicle should the usual radius rods of the vehicle break or become disconnected.

An important object of the invention is to provide a device of this character which may be readily and easily applied to motor vehicles by persons unfamiliar with mechanics and one which is so constructed that the rod proper may move with respect to the means employed for connecting the auxiliary radius rod to the vehicle chassis.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
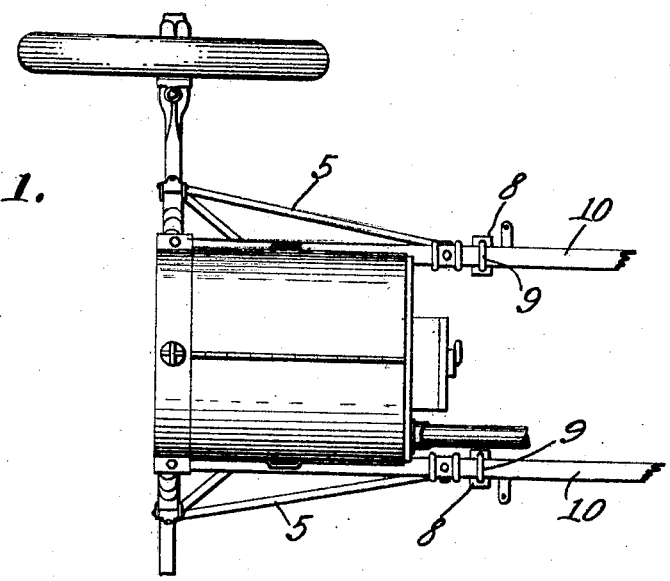
Figure 1 is a fragmental plan view illustrating a radius rod constructed in accordance with the invention as positioned on a motor vehicle construction.
Figure 2:
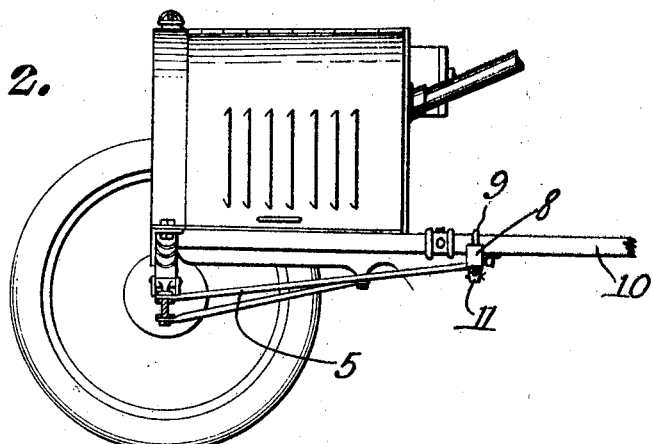
Figure 2 is a side elevational view thereof.

Referring to the drawing in detail, the radius rod forming the essence of the invention is indicated by the reference character 5 and has its forward end formed with an opening for the reception of the usual spring perch which extends through the axle in the usual manner and secures the rod to the axle.

The opposite end of the rod 5 is supplied with a ball 6 which rests in the socket 7 formed in the block 8 that forms a part of the securing means employed for securing this end of the radius rod to the side rail of the frame of the vehicle.

Figure 3:
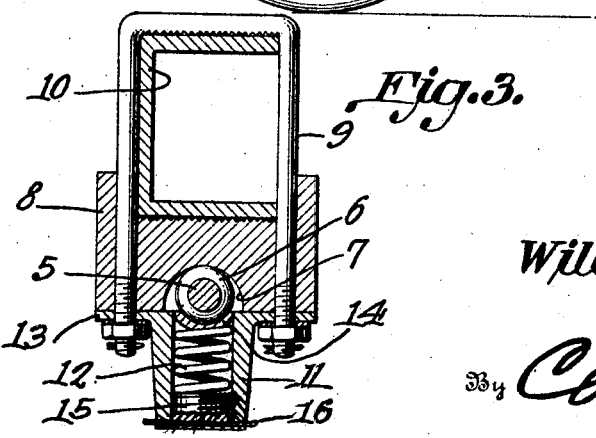
Figure 3 is a longitudinal sectional view through the clamp employed for securing the inner end of a radius rod to the vehicle frame.

This block 8 or body portion is formed with a recess disposed in the upper surface thereof, the recess being of a width to accommodate the side rail of the chassis as clearly shown by Figure 3 of the drawing. Openings are also formed in the body portion 8 and arranged to receive the inverted U-bolt 9 that passes over the side rail of the vehicle frame which is indicated by the reference character 10 to clamp the body portion in position.

Cooperating with the body portion 5 is a removable supporting section 11 that is hollow to accommodate the coiled spring 12, the supporting member being provided with a flange 13 which is formed with openings registering with the openings in the body portion 8 to receive the threaded ends of the inverted U-shaped bolt 9 to secure the supporting member 11 to the body portion 8.

Mounted on the upper end of the spring 12 is a curved seat 14 curved to conform to the curvature of the ball 6 so that the upward pressure of the spring 12 will exert a pressure on the ball 6 to yieldingly support the same.

Tension is brought to bear on the seat 14 as before stated by means of the coiled spring 12, which is urged upwardly by means of the threaded member 15 that operates in the threaded end of the support 11. Openings are formed in the threaded member 13 to accommodate the cotter key 16 to the end that the threaded member 15 will be locked against movement, after the desired adjustment has been made.

From the foregoing it will be seen that the auxiliary radius rods constructed in accordance with the invention may be readily and easily positioned by removing the usual spring perch and passing the threaded shank thereof, through the opening at the forward end of the radius rod, the opposite end of the radius rod being secured within the clamping member.

I claim:—

In a radius rod connector, a block having an upper cut out portion to permit the block to be positioned over the side rail of a vehicle, an inverted U-bolt adapted to embrace a portion of the side rail and adapted to extend through the block to secure the block to the side rail, said block having a socket member, a removable supporting section having an opening extending therethrough and adapted to be secured to the under surface of the block adjacent to the socket member, a removable member for closing the outer end of the supporting section, a spring resting on the removable member and adapted to be adjusted by the movable member, a seat supported at one end of the spring, said seat being curved to engage a head on one end of a radius rod.

In testimony that I claim the foregoing as my own, I have hereto affixed my signature.

WILLIAM P. CHANDLER.